US008416255B1

(12) United States Patent
Gilra

(10) Patent No.: US 8,416,255 B1
(45) Date of Patent: Apr. 9, 2013

(54) METHODS AND SYSTEMS FOR USING COLORS AND COLOR THEMES

(75) Inventor: Anant Gilra, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 683 days.

(21) Appl. No.: 12/470,711

(22) Filed: May 22, 2009

(51) Int. Cl.
*G09G 5/02* (2006.01)
(52) U.S. Cl.
USPC ........... 345/593; 345/594; 345/595; 345/597; 715/700; 715/810
(58) Field of Classification Search .................. 345/593, 345/594, 595, 597; 715/700, 810
See application file for complete search history.

(56) References Cited

U.S. PATENT DOCUMENTS

| 6,944,332 | B1* | 9/2005 | Brechner | 382/165 |
|---|---|---|---|---|
| 8,041,111 | B1* | 10/2011 | Wilensky | 382/168 |
| 2003/0151611 | A1* | 8/2003 | Turpin et al. | 345/589 |
| 2005/0111737 | A1* | 5/2005 | Das et al. | 382/190 |
| 2006/0005114 | A1* | 1/2006 | Williamson et al. | 715/502 |
| 2006/0066629 | A1* | 3/2006 | Norlander et al. | 345/594 |
| 2007/0116370 | A1* | 5/2007 | Smirnov | 382/245 |
| 2007/0242877 | A1* | 10/2007 | Peters et al. | 382/167 |
| 2008/0187218 | A1* | 8/2008 | Strom | 382/166 |
| 2010/0077350 | A1* | 3/2010 | Lim et al. | 715/810 |
| 2010/0110101 | A1* | 5/2010 | Relyea et al. | 345/594 |

OTHER PUBLICATIONS

U.S. Appl. No. 11/952,564, Gregg Wilensky.
Benavente, R. et al., "A Data Set for Fuzzy Colour Naming", COLOR Research and Application 2006, 31(1): 48-56.
Conway, D. M. "An Experimental Comparison of Three Natural Language Colour Naming Models", In Proc. east-west Int. conf on Human-Computer Interaction 1992, pp. 328-339.
Freund, Y. et al., "A Decision-Theoretic Generalization of on-Line Learning and an Application to Boosting", Journal of Computer and System Sciences 1997.
Kuler, http://kuler.adobe.com as downloaded from the Internet on May 18, 2009.
Kuler, http://kuler.adobe.com/links/kuler_help.html as downloaded from the Internet on May 18, 2009.
"Color Theme application", http://kuler.adobe.com/#.
Lammens, J. M. "A Computational Model of Color Perception and Color Naming", PhD thesis, University of Buffalo Jun. 1994.
Lin, H. -T. "A Note on Platt's Probablistic Outputs for Support Vector Machines", 2003.
Mojsilovic, A. "A Computational Model for Color Naming and Describing Color Composition of Images", IEEE Transactions on Image Processing May 2005, 14(5): 690-699.
Platt, J. "Platt Scaling Algorithm: Probabilistic Outputs for Support Vector Machines and Comparision to Regularized Likelihood Methods", In Advances in Large Margin Classifiers Mar. 26, 1999, pp. 1-11.
Rubner, et al., "The Earth Mover's Distance as a Metric for Image Retrieval", http://vision.stanford.edu/public/publication/rubner/rubnerTr98.pdf.
Van De Weijer, J. et al., "Learning Color Names from Real-World Images", Proc. CVPRO7 2007 , Minneapolis, USA.
B601 U.S. Appl. No. 11/952,564, filed Dec. 7, 2007.

* cited by examiner

*Primary Examiner* — Ke Xiao
*Assistant Examiner* — Kim-Thanh T Tran
(74) *Attorney, Agent, or Firm* — Kilpatrick Townsend & Stockton LLP

(57) ABSTRACT

Systems and methods are disclosed for using colors and color themes. One embodiment uses color(s) already included in a design to select and suggest other color(s) or color themes. For example, a design application may provide a listing of suggested color themes based on the colors used in a design area or in selected item(s) of a design area. Such a listing can be ordered based on assessments of how well the color themes match. The listing can also be updated in real time. For example, a designer adding a color to a design may trigger an update to the color theme listing.

24 Claims, 5 Drawing Sheets

METHODS AND SYSTEMS FOR USING COLORS AND COLOR THEMES

FIELD

This disclosure generally relates to computer software that runs, displays, provides, or otherwise uses electronic content.

BACKGROUND

Color is important in images, graphics, videos and other electronic content. For those creating such content, selecting colors that work well together can be difficult and time consuming. Designers can save time and effort by considering groups of colors, known as color themes, that have been used together in the past. For example, Adobe® Kuler® allows designers to reference color themes that each contains five colors. Current imaging and graphics software products allow a designer to reference color themes, such as those from Adobe® Kuler®, to identify popular, highly-rated, or the latest color themes, among others. Since color themes are often named or tagged with descriptive terms, designers have also been able to search for color themes using simple text searches. While such searching is useful, designers could benefit from additional guidance with respect to selecting and using colors and color themes. For example, a designer may want help selecting colors that best match with one or more colors that the designer has already selected for use in a particular design.

SUMMARY

Systems and methods are disclosed for using colors and color themes. One embodiment uses color(s) already included in a design to select and suggest other color(s) or color themes. For example, a design application may provide a listing of suggested color themes based on the colors used in content colors, i.e., colors already used a design area or in selected item(s) of a design area in content that is being created. A listing of suggested color themes can be ordered based on assessments of how well the color themes match the content colors. A listing of color theme suggestions can also be updated in real time so that the designer is always presented with the most relevant color theme suggestions. For example, a designer adding a color to a design may trigger an update to the color theme listing that accounts for the new color.

Certain exemplary methods involve providing an interface for authoring content on a computer apparatus and receiving or identifying colors used in content displayed on the interface. The method further comprises selecting color themes using those colors and displaying the selected color themes on the interface. As described in the prior example, an interface can display a listing of the color themes to provide suggestions for colors that will go well with the colors already displayed on the interface. Certain embodiments update such a listing of color themes based on a new color added to the interface, on a color deleted from the interface, and/or on a color changed on the interface, among other things. The listing of color themes can also be determined based on less than all of the colors already used in the content. For example, the listing may be determined based on selected objects or relative amount of color in the content.

Other exemplary embodiments are methods that involve selecting color themes by selecting amongst candidate color themes based on proximity values determined for the candidate color themes. Such proximity values for the candidate color themes can be determined by comparing content colors to candidate color theme colors. In one embodiment, the proximity value for each candidate color theme is determined by determining a first group of representative colors based on content colors, determining a second group of representative colors based on candidate color theme colors, and determining a proximity value for the candidate color theme based on representative colors common to the first group and second group. To improve efficiency and/or reduce calculations, the set of representative colors can be a subset of the entire range of colors in a color space. Various other measures can also be employed to reduce or eliminate the calculations used to identify color themes and to make feasible doing so in real time or based on user changes to displayed content.

These exemplary embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Systems and methods are disclosed for using colors and color themes. Embodiments can provide color suggestions or other guidance given colors already used in a design. The colors that are already in a design may be used to identify and/or suggest other colors for potential inclusion in the design. For example, a designer may have included a particular shade of red and a particular shade of blue in a design as part of a user interface design of an application that is being developed. The design software may identify these two colors and use them to suggest other colors. For example, the design software may suggest a five-color color theme having a first color that is close to the particular shade of red and a second color that is close the particular shade of blue. This and other well-matching color themes can be suggested for use in the design. Suggested color theme colors allows a designer to select a suggested color theme color to replace an existing content color. For example, the first color of the above mentioned five-color color theme can be used replace the particular shade of red to which it is similar. As another example, one or more of the other colors of a color theme (e.g., the third, fourth, or fifth colors of the above mentioned five-color color theme) may be added to the design. For example, a shade of green may be added to the design by selecting the color in one of the color themes.

The color suggestions can also be updated. For example, upon adding a color, a suggested color listing may be updated to suggest those color themes that best match. Thus, if the shade of green is added in the above example, the three colors now included in the design could be used to identify suggested color themes. Similarly, if a color is removed from a design, the listing of suggested color themes may be similarly updated. Various other changes can initiate or trigger an update of a listing of suggested colors, including, but not limited to, changes to the amount of a color that is used in a design, changes to user preferences, and changes to objects that are currently selected. For example, a user can select a button graphic to receive suggestions of color themes that best match the colors of that selected button graphic. When no item is selected, the suggested color theme listing can be based on the array of the colors used in the entire design.

These illustrative examples are given to introduce the reader to the general subject matter discussed herein and are not intended to limit the scope of the disclosed concepts. The following sections describe various additional embodiments and examples of methods and systems of using colors and color themes.

Illustrative Computing Devices and Systems

Figure 1:
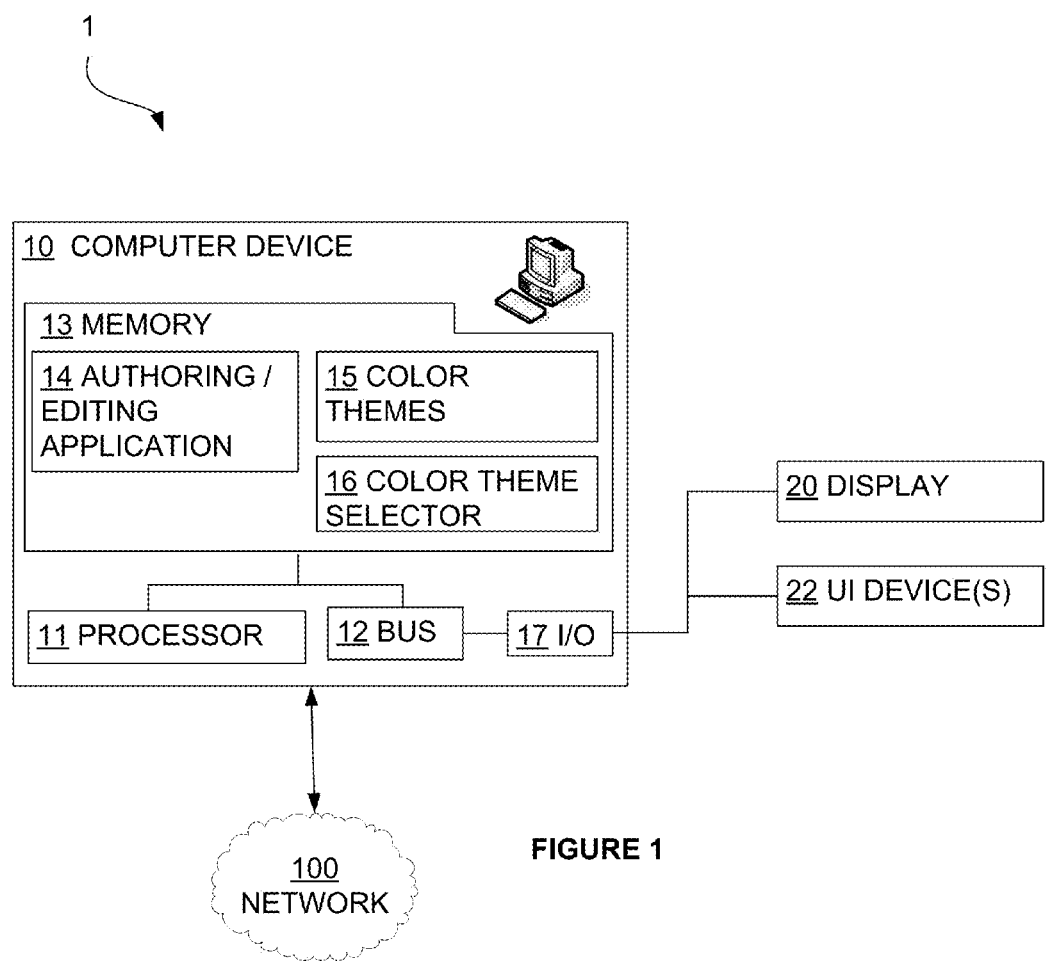
FIG. 1 is a system diagram illustrating an illustrative network environment according to certain embodiments.

Referring now to the drawings in which like numerals indicate like elements throughout the several Figures, FIG. 1 is a system diagram illustrating an illustrative content authoring environment according to certain embodiments. Other embodiments may be utilized. The environment 1 shown in FIG. 1 comprises a computer device 10. Various computing applications can be executed to configure the computing device 10 to facilitate authoring of electronic content. In FIG. 1, aspects of the computer device 10 are shown as functional or storage components. For example, an authoring/editing application 14, color themes 15, and a color theme selector component 16 are shown as residing in memory 13. As is known to one of skill in the art, the memory may comprise any suitable computer-readable medium, such as a random access memory (RAM) coupled to a processor 11 that executes computer-executable program instructions. Such a processor 11 may comprise a microprocessor, an ASIC, a state machine, or other processor, and can be any of a number of computer processors.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise code compiled or derived from any suitable computer-programming language, including, for example, C, C++, C#, Visual Basic, Java, Python, Perl, JavaScript, and ActionScript. Instructions may also take the form of declarative statements including HTML, XML, MXML, etc.

The computing device further comprises a bus 12 and an I/O interface that interfaces with a display 20 and/or user input device(s) 22. Such display 20 and input device(s) 22 may be external or internal devices such as a mouse, a CD-ROM, DVD, a keyboard, a display, audio speakers, or other input or output devices. The network 100 shown may be the Internet or any other network. In other embodiments, other networks, intranets, combinations of networks, or no network may be used. Alternative configurations are of course possible.

Examples of a computer device 10 include, but are not limited to, personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or application authoring programs.

Figure 2:
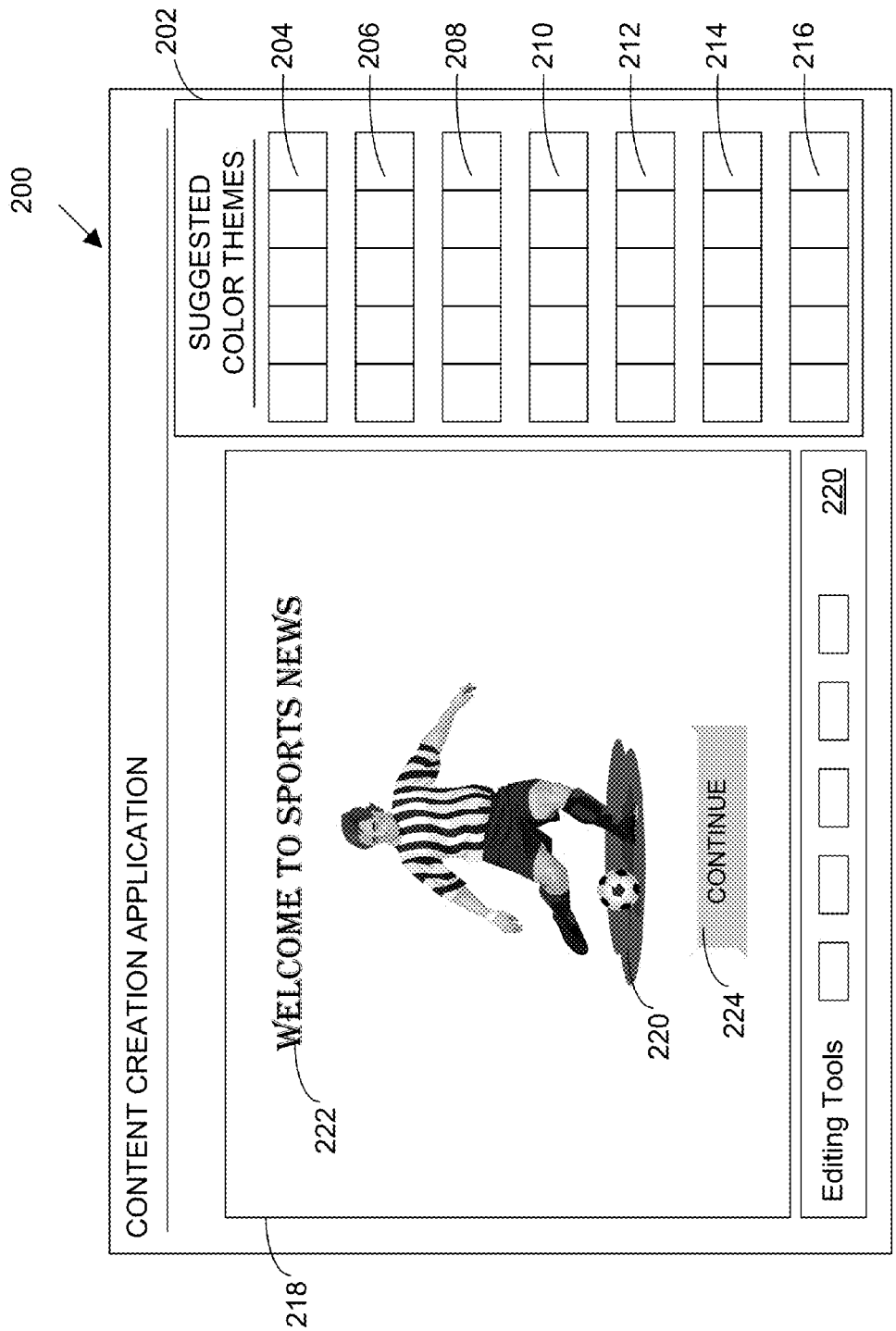
FIG. 2 illustrates an exemplary interface of a content creation application, according to certain embodiments.

Certain embodiments facilitate the use of colors in an authoring/editing application 14. A designer may be using authoring/editing application 14 to develop a graphic or other content. For example, FIG. 2 illustrates an exemplary interface 200 of a content creation application, according to certain embodiments. The interface 200 includes a canvas/artwork area 218 upon which a designer can create visual content. The interface also provides various editing tools 220 and a suggested color themes area 202. In this example, a designer has created content that includes a title 222, stating "WELCOME TO SPORTS NEWS," a depiction 220 of a sports player, and a button 224, labeled "CONTINUE."

Each of these components 220, 222, 224 displayed in the canvas/artwork area 218 can include one or more colors. These colors can be used to identify and suggest other colors for use in the content. For example, a color theme selector 16 or other selection component can identify colors that are used or that are part of particular selected objects in the displayed content. These colors can then be used to search candidate color themes, such as color themes 15, for matching color themes. For example, a color theme may have three colors that are very similar to three colors used in the content, as well as two additional colors. Those additional colors (and in some embodiments) the entire color theme can be presented in the suggested color themes area 202 of the content creation application 200. Multiple suggested color themes 204, 206, 208, 210, 212, 214, 216 can be identified and presented. In certain embodiments, the suggested color themes 204, 206, 208, 210, 212, 214, 216 are ordered based on how well the color themes match the color used in the content.

Exemplary Methods of Suggesting Colors Based on Content Colors

Figure 3:
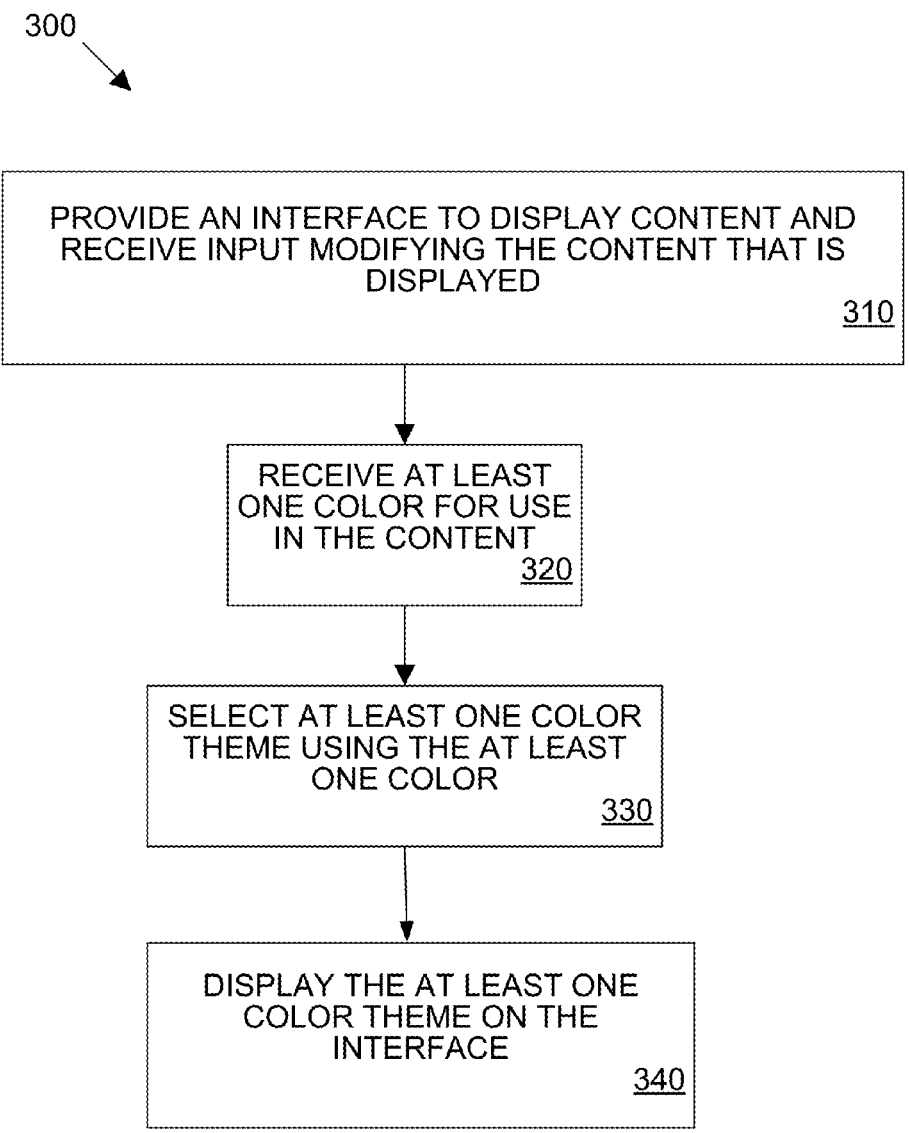
FIG. 3 is a flow chart illustrating an exemplary method of suggesting colors based on colors already used in content, according to certain embodiments.

FIG. 3 is a flow chart illustrating an exemplary method 300 of suggesting colors based on colors already used in content, according to certain embodiments. The method 300 of FIG. 3 involves providing an interface to display content and receive input modifying content that is displayed, as illustrated by block 310. For example, this may involve providing an interface for authoring content on a computer apparatus, the interface provided according to instructions embodied in a computer-readable medium which configure the computer apparatus to display content and receive input modifying the content that is displayed on the interface. An exemplary interface may be provided by a content authoring application, such as authoring/editing application 14 shown in FIG. 1 in which case, as an example, the interface could respond to user input from UI devices 22 to display content (and edits to content) on display 20.

The exemplary method 300 further involves receiving at least one color for use in the content, as shown in block 320. For example, this may involve identifying all of the colors that are used in the content. Alternatively, or in addition, it may involve receiving one or more user identified colors. A content authoring application and/or color theme component can maintain a list or array of colors that can be accessed whenever a color theme suggestion is needed. As another example, receiving the at least one color may involve identifying colors that are used in an object that is selected in the content on the interface. Receiving the at least one color can comprise receiving a gradient object and identifying the nodes of the gradient as the at least one color, receiving a pattern and identifying one or more of the most common colors of the pattern as the at least one color, or receiving a photograph image and identifying one or more of the most common colors of the photograph image as the at least one color, as examples.

The exemplary method 300 further involves selecting at least one color theme using the at least one color, as shown in block 330. There are various alternative methods of selecting the at least one color theme using the at least one color. In certain embodiments, such selection involves comparing individual colors to identify color themes that have at least some colors that are close to (with respect to color comparison determination) the colors used in the content. Additional embodiments are discussed herein and will be understood by those of skill in the art based on the selection techniques and principles provided herein.

The exemplary method 300 further involves displaying the at least one color theme on the interface as shown in block 340. Displaying the at least one color theme may comprise displaying a listing of color themes on the interface. Generally, as an example, a software application used to author content involving color may use or access a panel that provides color theme suggestions. In some cases, such a panel can automatically sort and arrange color themes based on determination(s) of which will be of most interest to a user, e.g., based on some or all of the colors already being used or upon a user's color selection.

Certain exemplary embodiments involve triggering a change to the listing of color themes based on changes to the content, among other things. For example, if an authoring application maintains an array of colors that are used or selected in content displayed on a canvas or display area, an update of the color theme suggestions can be triggered when a color is added or deleted from the array of colors. Providing dynamic color suggestions and prompting can facilitate design of content involving color in a variety of ways. For example, as a designer creates a new object and adds a fill color to it, the designer can see other colors which will be considered "well gelling" or otherwise appropriately matching. As another example, as a designer adds a color node to a gradient, the designer can be prompted with other possible colors selected based on the color nodes in the gradient. The concept of dynamically suggesting possible colors to use while one designs has additional benefits as well.

A listing of color or color theme suggestions can be automatic, dynamic, and/or updated frequently, essentially reflecting a user's real-time changes. Generally, as examples, updating a listing of suggested color themes can occur when a new color is added to the interface, a color is deleted from the interface, a color changed on the interface, or when there is a change of selected objects or colors. For example, if a color array is maintained for colors that will be used to identify suggested color themes, the color array can be modified, when: (a) an object/layer is selected; (b) multiple objects/layers or a group are selected at the same time; (c) a color picker is selected, e.g., fill, stroke etc. are selected; (d) as a user adds color nodes to a gradient; (e) a pattern is selected; or (f) a combination of one or more of these occurrences, among other things.

The suggested color themes displayed by the interface may be available for selection by the content author. For example, the exemplary method 300 may involve receiving a selection of color from a displayed color theme for use in the content displayed on the interface. Such a selection may be made to identify a color for a new or existing object in the content. For example, a color may be selected from color theme 204 of the interface 200 of FIG. 2 for the title 222 of the content.

In one embodiment, a user can make a selection from the color theme suggestions and the colors in the content can be updated. For example, the similar content colors can be replaced with colors from the color theme, providing a simple mechanism for a user to preview and/or change their color selections to colors of one or more suggested color themes automatically. For example, a color theme suggestion window may receive a selection of a color theme to use to replace content colors. A user may specify 2 or 3 main colors in their content, for example, and receive color theme suggestions based on those colors. When the user chooses a new color theme, for example, from the suggested color themes, the colors of the content can be changed automatically or based on a user selection or confirmation process. Some or all of the colors of the selected color theme may be matched with some or all of the content colors, for example, by determining colors that are similar to one another.

Colors can be compared and/or matched in a variety of ways. For example, color hue, value, saturation, color space distance, other color attributes or combinations of attributes can be compared. A color theme color that matches a content color can be used to replace that content color in the content. Colors may be matched automatically, without user input. In other embodiments, the interface could walk the user through a selection or confirmation process. For example, an option could be presented to replace a first content color with a first color theme color, and then with an option to replace a second content color with a second content color, etc. The interface may allow the user to select a color theme color and then use that color to replace subsequently selected content color(s). Replacing colors, in these examples, can thus be based on automatic matching, user selections, or a combination of both.

Certain exemplary embodiments involve, upon a trigger, providing a color array to a color theme suggestion/matching component. For example, a color array may be provided to a color theme component through an Application Programming Interface (API) that accepts an array of colors and a Boolean (optional). Such an API may use this or another array of colors to compile and display a list of color themes based on a proximity match between the array and color themes. A user can then select and use any of the colors from any of the closest matching themes, which change in real time based on the triggering (e.g., via selections). Any change to the color array can be used to cause a new trigger to be sent, for example, through an API. In some embodiments, when there is no selection, automatically all colors in the document would be sent via the API. Since this is a special case, which may happen very often, the array need not be modified each time. Instead, a global array of colors could be maintained and cached, and this global array could be sent with a Boolean specifying this has all colors in the document.

Exemplary Methods of Suggesting Colors Based on
Content Colors

The proximity or closeness of colors to one another can be calculated or estimated in a variety of ways. Such determinations can facilitate identifying color themes that can be suggested for use in content being developed based on colors already in that content. Proximity determinations can also be used to sort color themes. Additionally, in certain embodiments suggested color themes are identified by determining proximity values for various candidate color themes and multiplying those proximity values by weights so that the highly-rated and/or most popular color themes are more likely to be suggested.

One exemplary technique for computing the proximity content colors with a color theme involves using a subset of representative colors. For example, the set of Web Safe Colors can provide such a subset of colors (e.g., 216 colors for RGB 8 bit) where each color is a multiple or 0x33 i.e. 0x00, 0x33, 0x66, 0x99, 0xCC, 0xFF. As a specific example, 0x336633 is one such Web Safe Color. Representing a color by its closest Web Safe Color provides a mechanism for comparing two colors. For example, if two colors are represented by the same Web Safe Color, the two colors can be considered similar to one another.

Figure 4:
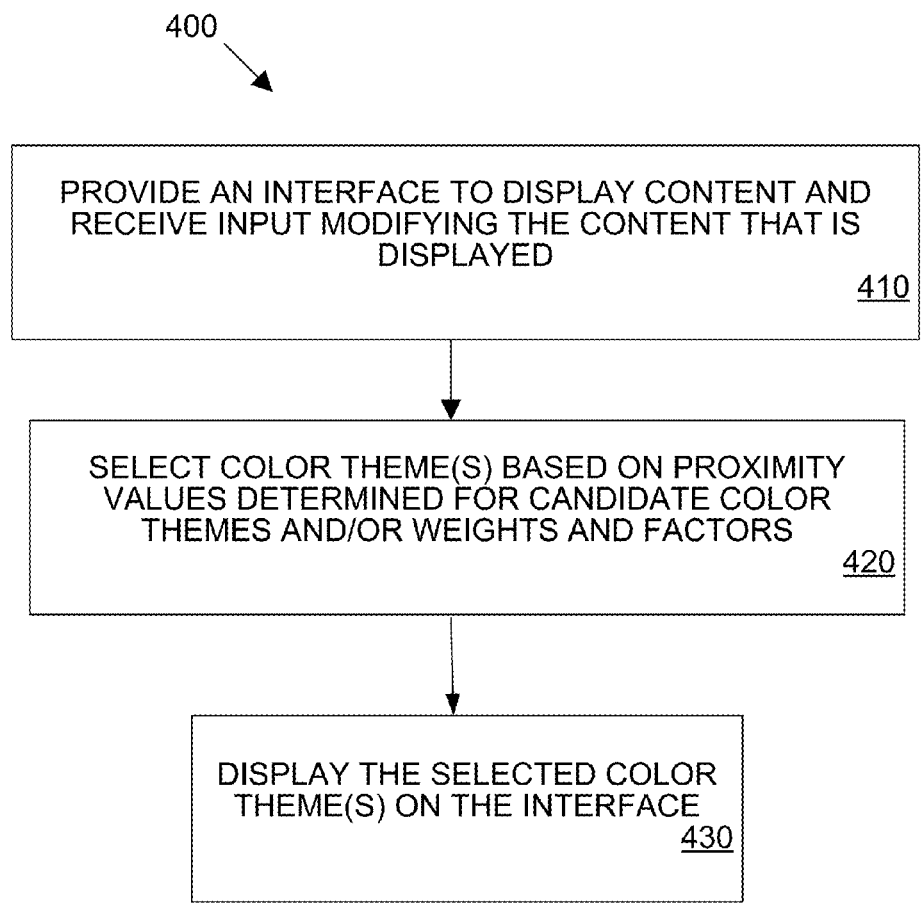
FIG. 4 is a flow chart illustrating an exemplary method of suggesting color themes based on color to color proximity determinations, according to certain embodiments.

FIG. 4 is a flow chart illustrating an exemplary method 400 of suggesting color themes based on color to color proximity determinations, according to certain embodiments. The method 400 of FIG. 4 involves providing an interface to display content and receive input modifying content that is displayed, as illustrated by block 410. This may involve providing an interface for authoring content on a computer apparatus, the interface provided according to instructions embodied in a computer-readable medium which configure the computer apparatus to display content and receive input modifying the content that is displayed on the interface.

The method 400 involves selecting at least one color theme by selecting amongst candidate color themes based on proximity values determined for the candidate color themes and/or weights and factors, as shown in block 420. Proximity values for the candidate color themes are determined by comparing at least one color in the content displayed on the interface to colors of the candidate color themes. The method 400 further involves displaying the at least one color theme on the interface, as shown in block 430. The suggested color themes area 202 displayed on the exemplary interface 200 of FIG. 2 provide one example of such a display.

Content colors, e.g., the colors of a color array, are sent from (or used by) a content authoring application to request color suggestions. Those colors can be used to identify color theme suggestions based on a comparison of representation values of each content color to representation values of each color of candidate color themes. Suggested color themes can be those color themes that match well or best with the content colors.

Figure 5:
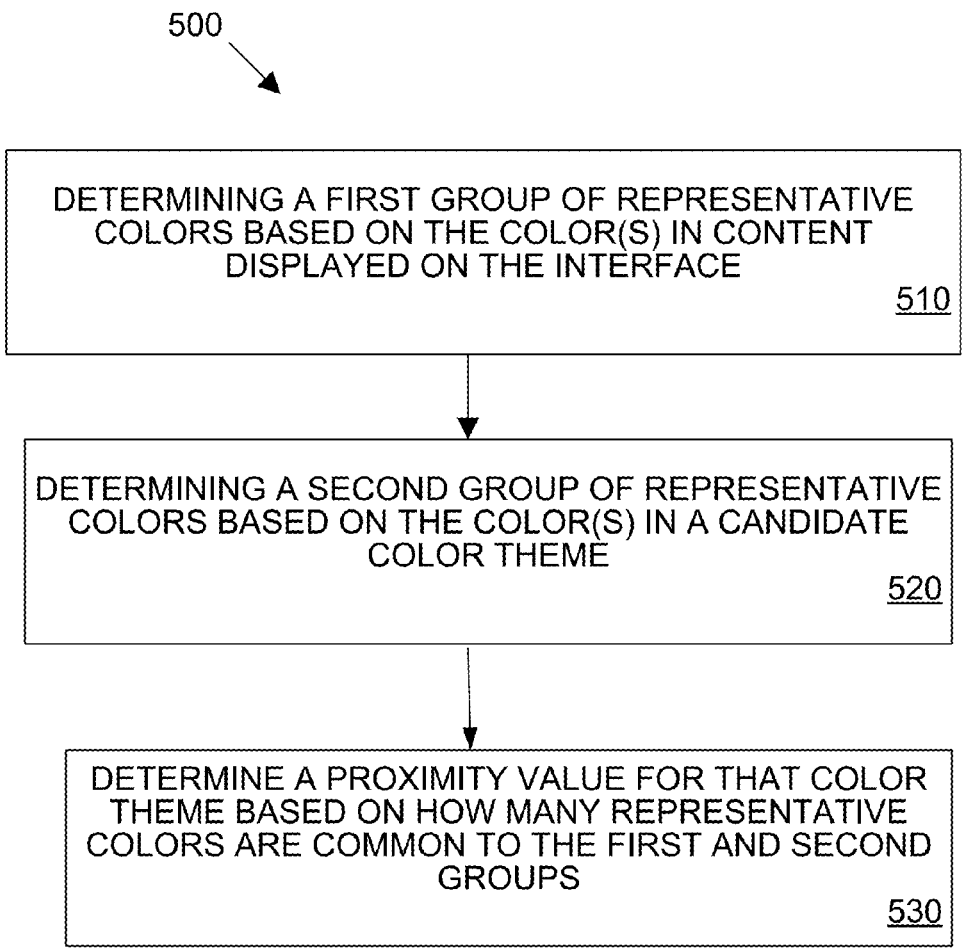
FIG. 5 is a flow chart illustrating an exemplary method of determining proximity values for the candidate color themes determined in the method of FIG. 4, according to certain embodiments.

FIG. 5 provides an exemplary method 500 of determining proximity values for the candidate color themes determined in the method 400 of FIG. 4. The exemplary method 500 determines proximity values for the candidate color themes by determining a first group of representative colors based on the at least one color in the content displayed on the interface, as shown in block 510. The exemplary method 500 further involves determining a second group of representative colors based on colors of a candidate color theme, as shown in block 520. The groups are then compared. The method 500 can determine a proximity value for that candidate color theme, for example, based on how many representative colors are common to the first group and second group of representative colors, as shown in block 530. A proximity value for the candidate color theme, in one example, is the sum of proximities of each of the at least one color in the content displayed on the interface to each color of the candidate color theme.

As a specific example, colors A1, A2, and A3 may be displayed in content and a given color theme may include colors B1, B2, B3, B4, B5, and B6. For this color theme, if A1 and B2 are represented by the same representative color (R1) and A2 and B4 are represented by a same representative color (R2), the color theme may be considered a good match for the content since it has at least two similar colors. In a simple example, the color theme can be said to have a proximity value of 2. Other embodiments will calculate proximity values in different ways. Given the relatively high proximity value, the colors or that color theme can be suggested for possible use in the content. Another color theme may include colors C1, C2, C3, C4, C5, and C6, none of which share a color in common with any color A1, A2, or A3 displayed in the content. This color theme may be considered a poor match for the content since it does not have similar colors. The representative colors used, e.g., R1, R2, etc, can be a subset of the entire range of colors in a color space, e.g., the Web Safe Colors. The use of representative colors can simplify calculations, among other benefits. Efficiency can also be improved in certain embodiments by caching the first set of representative colors for future proximity value determinations.

In certain embodiment the proximity of a color theme is determined using proximity individual colors to one another. Proximity between any two individual colors can, of course, be calculated in a variety of ways. In one embodiment, the proximity between any two individual colors is zero (0) if the two individual colors do not have the same representative color and greater than zero if the two individual colors have the same representative color.

Certain embodiments involve the following exemplary method for comparing two colors using Web Safe Colors as representative colors. In this exemplary method, Proximity (P) between two colors is defined as:

$$P(\text{Color } i, \text{Color } j) = 0, \text{ if representation value is not the same.}$$
$$= 1 - 1/3 * (\text{Red Diff} + \text{Green Diff} + \text{Blue Diff}) / 0xFF,$$
$$\text{if representation value is the same. } (0xFF = 255)$$

For example, 0x013510 and 0x102402 both representation value=7, and P (Color 0x013510, Color 0x102402)=1−⅓* (15+17+14)/255=0.82.

In some embodiments, comparing a color theme to a group of colors used in content (e.g., an array of colors) simply involves summing the proximities of the various colors between the two sets of colors:

$P(\text{Color Array,theme}) = \text{Summation}(i,j)\text{Proximity}$
$(\text{Color } i \text{ in array,Color } j \text{ of theme})$ The proximity of each content color with each color theme color is added to get the total proximity of the content color array with the color theme.

In each individual color theme proximity determination, colors can be waited equally or unequally. In certain embodiments, array colors can be weighted based on their use in the content. For example, colors that are closer on a display to a newly created object can be given higher weights than other colors. Weights may also be used to reflect the amount of each color that is used in the content. For example, weights can be proportional to the amount of color (e.g., the area occupied by a given color). Generally, content colors occupying a lesser area can be given a lower weight, making them less significant in comparing the content colors with color themes. Similarly, weights may reflect how many times a content color is used, e.g., that three different button objects have a same fill color. A weight can be proportional to the number of times a color appears. Weights may also reflect how recently a color was included, the type of use a color has (fill, gradient, border, etc.), which user added the color, whether a color was user-selected or a default color, and/or reflect a combination of any of these exemplary factors and/or any other factors. Generally, individual color-to-color proximity determinations can be weighted in a number of ways to facilitate various color suggestion criteria.

Proximities determined for a color theme (e.g., color theme A has a proximity of 0.8, color theme B has a proximity of 0.4, etc.) can also be weighted to facilitate selection of color themes for suggestion. In some embodiments, the proximity can be multiplied by a weight, which can be, but need not be, automatically generated based on a user preference to weight color theme recommendations. For example, the highest rated color themes could have weights like 1, 0.99, 0.98, 0.97 etc. and non-rated color themes could be given a lesser weight, such as 0.5.

Proximity values (weighted or not) can be used to select, order, and present appropriate color theme suggestions to a content author or other user. For example, color theme suggestions can be identified, sorted, and displayed in descending order so that a user is presented with color theme suggestions.

A variety of techniques can facilitate efficiency and other aspects of matching colors. For example, the representation value of all colors in each color theme can be stored or cached and maintained in a database. If a new theme is added, its representation value could also be added to the database. Optimizing a color matching can be facilitated by comparing representation colors to significantly reduce the actual number of comparisons that might otherwise be required to compare two colors with respect to specific color attributes. Efficiency can also be enhanced in certain embodiments by caching the values of an older array for later reuse so that only differences need be added and deleted. Calculations that were previously performed do not need to be repeated. Efficiency can also be enhanced in embodiments in which only a limited number of color themes will be suggested. Color theme comparisons can be reduced, for example, by eliminating further determinations with respect to color themes where there is only one match (or a small number of matches) of representative colors. For example, if a current interface display allows n (e.g.: 20) themes to be displayed, a window of 20 maximum proximities can be maintained and the rest need not be sorted. Insertion sort techniques can be used if, for example, they are less than the minimum of the 20 color themes. Efficiency can also be improved potentially by identifying circumstances where a set of content colors has already been compared with candidate color themes. For example, when an array of content colors is received to determine suggested color themes, the array can be compared with one or more prior arrays to see if the particular array has already been compared. Efficiency can also be enhanced by limiting the color comparisons in other ways. For example, an array of content colors may be compared only with a subset of candidate color themes, e.g., only those categorized as "Last 7 days," etc.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

The disclosed embodiments are merely illustrative. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

That which is claimed:

1. A computer-implemented method comprising:
providing an interface for authoring content on a computer apparatus, the interface provided according to instructions embodied in a computer-readable medium which configure the computer apparatus to display content and receive input modifying content that is displayed on the interface;
identifying a plurality of colors in the content displayed on the interface;
selecting at least one color theme, wherein each of the at least one color theme is selected using multiple colors of the plurality of identified colors;
displaying the at least one color theme in a listing of color themes on the interface; and
updating the listing of color themes based on a change in color of the content displayed on the interface, wherein the change in color of the content comprises a new color added to the content displayed interface, a color deleted from the content displayed on the interface, or a color changed in the content displayed on the interface.

2. The method of claim 1, wherein identifying the plurality of colors comprises receiving a selection of one or more colors of an object displayed in the content on the interface.

3. The method of claim 1 further comprising updating the listing of color themes based on a change of selected objects displayed in the content on the interface.

4. The method of claim 1, further comprising receiving a selection of color from a displayed color theme for use in the content displayed on the interface.

5. The method of claim 1, wherein the plurality of colors comprises all of the colors in the content displayed on the interface, wherein each of the at least one color theme is selected using all of the colors in the content displayed on the interface.

6. The method of claim 1, wherein identifying the plurality of colors comprises receiving a gradient object and identifying the nodes of the gradient.

7. The method of claim 1, wherein identifying the plurality of colors comprises receiving a pattern and identifying one or more of the most common colors of the pattern.

8. The method of claim 1, wherein identifying the plurality of colors comprises receiving a photograph image and identifying one or more of the most common colors of the photograph image.

9. A computer-implemented method comprising:
providing an interface for authoring content on a computer apparatus, the interface provided according to instructions embodied in a computer-readable medium which configure the computer apparatus to display content and receive input modifying content that is displayed on the interface;
selecting at least one color theme by selecting amongst candidate color themes based on proximity values determined for the candidate color themes, wherein a proximity value for each of the candidate color themes is determined by comparing a plurality of colors in the content displayed on the interface to a plurality of colors of the respective candidate color theme; and
displaying the at least one color theme on the interface.

10. The method of claim 9, wherein proximity values for the candidate color themes are determined by:
determining a first group of representative colors based on the at least one color in the content displayed on the interface;
determining a second group of representative colors based on colors of a candidate color theme;
determining a proximity value for the candidate color theme based on representative colors common to the first group and second group of representative colors; and
wherein the representative colors are selected from a set of representative colors that is a subset of the entire range of colors in a color space.

11. The method of claim 10, wherein the set of representative colors consists of only Web Safe Colors.

12. The method of claim 10 further comprising caching the first set of representative colors for future proximity value determinations.

13. The method of claim 9, wherein a proximity value for a candidate color theme is the sum of color-to-color proximities of each of the at least one color in the content displayed on the interface to each color of the candidate color theme.

14. The method of claim 13, wherein proximity between any two individual colors is zero (0) if the two individual colors do not have the same representative color and greater than zero if the two individual colors have the same representative color.

15. The method of claim 9, wherein a proximity value for a candidate color theme is the weighted sum of color-to-color proximities of each of the at least one color in the content displayed on the interface to each color of the candidate color theme, wherein the weighted sum of color-to-color proximities is weighted based on use of color in the content.

16. The method of claim 15, wherein the weighted sum of color-to-color proximities is weighted based on relative positions of objects comprising colors in the content.

17. The method of claim 15, wherein the weighted sum of color-to-color proximities is weighted based on relative amounts of the colors in the content.

18. The method of claim 16, wherein the weighted sum of color-to-color proximities is weighted based on how many times a color is used in the content.

19. The method of claim 9, wherein selecting amongst candidate color themes based on proximity values comprises comparing weighted proximity values, wherein the proximity value of each color theme is weighted based on popularity or rating of the color theme.

20. The method of claim 9, wherein displaying the at least one color theme on the interface comprises ordering the color themes displayed based on the proximity value.

21. A system comprising:
an interface for authoring content on a computer apparatus, the interface provided according to instructions embodied in a computer-readable medium which configure the computer apparatus to display content and receive input modifying one or more colors of content displayed on the interface; and
a suggestion component for selecting at least one color theme, wherein each of the at least one color theme is selected using multiple colors of the plurality of identified colors, displaying a listing of the at least one color theme on the interface, and updating the listing based on a new color added to the interface, on a color deleted from the interface, or on a color changed on the interface.

22. The system of claim 21, wherein the suggestion component receives a selection of a color theme of the at least one color theme displayed on the interface and replaces one or more colors of content displayed on the interface with one or more colors of the color theme.

23. A non-transitory computer-readable medium on which is encoded program code, the program code comprising:
program code for providing an interface for authoring content on a computer apparatus, the interface provided according to instructions embodied in a computer-readable medium which configure the computer apparatus to display content and receive input modifying content that is displayed on the interface;
program code for identifying a plurality of colors in the content displayed on the interface;
program code for selecting at least one color theme, wherein each of the at least one color theme is selected using multiple colors of the plurality of identified colors;
program code for displaying the at least one color theme in a listing of color themes on the interface; and
program code for updating the listing of color themes based on a change in color of the content displayed on the interface, wherein the change in color of the content comprises a new color added to the content displayed interface, a color deleted from the content displayed on the interface, or a color changed in the content displayed on the interface.

24. The method of claim 1 wherein selecting at least one color theme comprises selecting a plurality of color themes wherein each color theme is selected using the same colors of the plurality of identified colors.

\* \* \* \* \*